United States Patent [19]

Mallams et al.

[11] 3,880,828

[45] Apr. 29, 1975

[54] ANTIBIOTICS 66-40B AND 66-40D FROM MICROMONOSPORA INYOENSIS

[75] Inventors: Alan K. Mallams, West Orange; Richard W. Tkach, Linden; Marvin J. Weinstein; Gerald H. Wagman, both of East Brunswick, all of N.J.

[73] Assignee: Schering Corporation, Bloomfield, N.J.

[22] Filed: Feb. 23, 1973

[21] Appl. No.: 335,185

[52] U.S. Cl. .......... 260/210 AB; 424/180; 424/181; 195/96
[51] Int. Cl. ............................................. C07c 47/18
[58] Field of Search .................. 260/210 AB, 210 K

[56] References Cited
UNITED STATES PATENTS
3,651,042  3/1972  Marquez et al. ............ 260/210 AB
3,753,973  8/1973  Umezawa et al. ................ 260/210 K OTHER PUBLICATIONS
Weinstein et al., "The Journal of Antibiotics," Vol. XXIII, No. 11, 1970, pp. 551-554.

*Primary Examiner*—Johnnie R. Brown
*Attorney, Agent, or Firm*—Carver C. Joyner; Stephen B. Coan; Raymond A. McDonald

[57] ABSTRACT

Fermentation of *Micromonospora inyoensis* under controlled aerobic conditions produces a plurality of antibiotic substances including Antibiotic 66-40B and Antibiotic 66-40D which were heretofore unrecognized and unknown. Also produced in the fermentation is garamine, a previously described substance which may be used to prepare semi-synthetic broad-spectrum anti-bacterial agents. A method for separating said compounds in substantially pure form is also described as are the chemical and biological properties of the novel compounds.

4 Claims, No Drawings

ANTIBIOTICS 66-40B AND 66-40D FROM MICROMONOSPORA INYOENSIS

This application relates to Antibiotic 66–40B and Antibiotic 66–40D which were heretofore unrecognized and unknown compositions of matter. More particularly, this application relates to novel antibiotic compounds that are produced by *Micromonospora inyoensis*. This application also relates to a method for isolating the compounds in substantially pure form free from the compounds coproduced therewith.

DESCRIPTION OF THE PRIOR ART

In British Pat. No. 1,274,518 is disclosed a novel *Actinomycete* which elaborates a composition of matter having substantial antibacterial activity, said *Actinomycete* being therein designated, *Micromonospora inyoensis*. The antibacterial activity elaborated was believed to be due exclusively to an antibiotic designated Antibiotic 66–40 (also known as sisomicin), the major product of the fermentation. Methods for isolating and purifying sisomicin are described, however, the methods employed failed to indicate the presence of other biologically active compounds. Subsequently, in the Journal of Antibiotics (Japan) Vol. XXIII, No. 11, pgs. 551–554 (1970), further data was published which relates to the sisomicin fermentation and the products thereof. We have now discovered that by employing techniques for isolating and purifying sisomicin other than those described in the British Patent, or the Japanese publication novel antibiotics may be obtained from the mother liquor of said purification.

DESCRIPTION OF THE INVENTION

The process aspect of the present invention may be performed by starting with the product of Example 2 of British Pat. No. 1,274,518 wherein the total antibacterially active material from the fermentation is obtained in solid form. This product is subjected to chromatography on silica gel using the lower phase of a solvent system consisting of chloroform, methanol, and concentrated ammonium hydroxide in the volume ratio of 1:1:1 to remove most of the sisomicin. The coproduced components emerge from the column as a mixture which, after evaporation to dryness, is subjected to repetitive chromatography on silica gel using the solvent mixture described hereinbelow. The first compound to emerge from the column is residual sisomicin. It is in turn followed by garamine, then by Antibiotic 66–40B with Antibiotic 66–40D being last to emerge. In view of the tendency for the compounds to overlap, it is usually preferable to rechromatograph each compound to remove the last traces to coproduced substances.

DESCRIPTION OF THE INVENTION

The invention being described and claimed herein, in one of its process aspects, relates to a process which comprises separating Antibiotic 66–40B, Antibiotic 66–40D and garamine from a mixture containing same by (a) dissolving said mixture in the solvent system consisting of chloroform, methanol, and 15 percent ammonium hydroxide in the volume ratio of 3:5:3, (b) adsorbing the resulting solution on silica gel, (c) selectively desorbing the substances from the silica gel using the above solvent system, (d) isolating said substances from solution and (e) rechromatographing the products from step (d) to obtain thereby the respective compounds free from substances coproduced therewith.

This invention in another of its process aspects relates to a method of eliciting an antibacterial effect which comprises administering to animals especially mammals a therapeutically effective dose of a member selected from the group consisting of Antibiotic 66–40B and Antibiotic 66–40D, a non-toxic acid addition salt or Schiff base-oxazolidine derivatives of said antibiotics.

This invention in its composition of matter aspect comprises Antibiotic 66–40B, Antibiotic 66–40D including acid addition salts, Schiff base-oxazolidine derivatives and solvates of such compounds wherein each of said antibiotics is free of substances coproduced therewith.

THE ANTIBIOTICS

Antibiotic 66–40B and Antibiotic 66–40D are epimeric pseudotrisaccharide antibiotics of the aminocyclitol aminoglycoside type. They are white amorphous solids having chemical properties characteristic of the class of compounds to which they belong. Thus, they form acid addition salts with most commonly used acids including mineral and hydrocarbon carboxylic acids. They also form Schiff base-oxazolidine derivatives with aldehydes. And, additionally, they form solvates with most commonly used organic solvents especially with polar organic solvents. With water, stable hydrates of specific constitution are formed. Generally, the acid addition salts, the Schiff base-oxazolidine derivatives, the solvates and hydrates exhibit the same antibacterial spectrum as the antibiotic base but differ somewhat in degree of activity. Thus, bacteria susceptible to one form of the compounds are susceptible to the other forms.

The two antibiotics give positive results in ninhydrin and Elson-Morgan tests and give negative results in the maltol, furfural and Sakaguchi tests. Garamine, the third component isolated by the process of this invention is a pseudodisaccharide aminoglycoside-aminocyclitol having moderate antibacterial activity. It has previously been obtained via chemical means from sisomicin. The physico-chemical properties of garamine are described in U.S. application Ser. No. 296,434 filed Oct. 10, 1972, and now abandoned by Alan K. Mallams, one of the instant inventors.

Physico-Chemical Properties of the Antibiotics

| Physical Constants | | Antibiotic 66–40B | Antibiotic 66–40D |
|---|---|---|---|
| (a) | Molecular weight (by mass spectrometry) | 433.2540 | 433.2565 |
| (b) | Empirical formula | $C_{18}H_{35}N_5O_7$ | $C_{18}H_{35}N_5O_7$ |
| (c) | Elemental analyses on the monohydrate | $C_{18}H_{35}N_5O_7 \cdot H_2O$ | |
| | Calculated | C=47.88%   H=8.26% | N=15.51% |
| Found | | C=47.89% | C=47.82% |
| | | H= 7.73% | H= 8.15% |
| | | N=15.32% | N=15.66% |

Physico-Chemical Properties of the Antibiotics — Continued

| Physical Constants | | Antibiotic 66-40B | Antibiotic 66-40D |
|---|---|---|---|
| (d) | $[\alpha]_D^{26°}$ (C=0.3% in $H_2O$) | + 152.8° | + 147.3° |
| (e) | Melting point (monohydrate) | 91°– 102°C | 92° – 103°C |
| (f) | Infrared (KCl) | 3340, 1690 1050, 1000 cm.$^{-1}$ | 3330, 1680 1075, 1000 cm.$^{-1}$ |
| (g) | Circular Dichroism | | |
| | 1. tetraaminocopper sulfate solution (TACU) | $[\Theta]_{290}$ +2530 | $[\Theta]_{290}$ − 8590 |
| | 2. cuprammonium A (Cupra A) | $[\Theta]_{290}$ + 1935 | $[\Theta]_{290}$ − 6270 |
| (h) | Nuclear Magnetic Resonance (NMR) in $D_2O$ - The following peaks and structural assignments are considered significant [δ values are set forth in parts per million (PPM)]: | | |
| | | Antibiotic 66-40B (δ) | Antibiotic 66-40D (δ) |
| | | 2.49 (3H, s, 3″—$NCH_3$), | 2.19 (3H, s, 3″—$NCH_3$), |
| | | 4.80 (1H, m, $H_4'$), | 4.66 (1H, m, $H_4'$), |
| | | 4.96 (1H, d, J=4HZ, $H_1''$), | 5.00 (1H, d, J=4Hz, $H_1''$), |
| | | 5.27 (1H, d, J=2.5Hz, $H_1'$) | 5.26 (1H, d, J=2.5Hz, $H_1'$) |

Antibiotic 66–40D shows a characteristic multiplet in the NMR which is due to the 4″-proton being in the axial configuration whereas Antibiotic 66–40D has the multiplet shifted downfield which is characteristic of the 4″-proton being in the equatorial configuration. (See structures below.)

The foregoing physico-chemical data in combination with stepwise degradation of the respective antibiotics to yield aminoglycosides and an aminocyclitol permits the assignment of the following structural formulae and stereochemistry for the antibiotics of this invention.

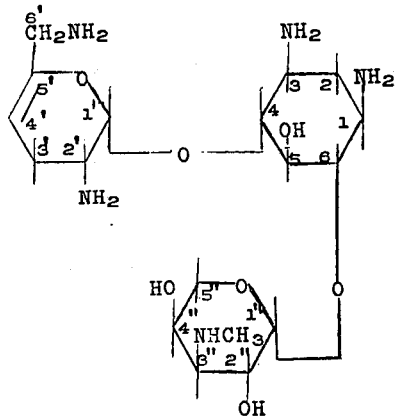

Antibiotic 66-40D

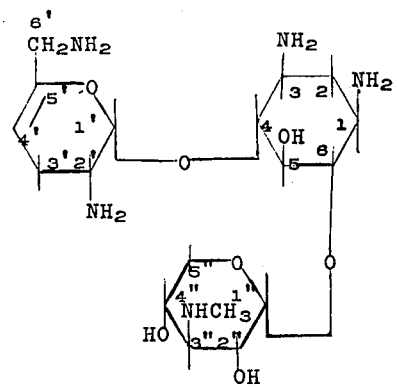

Antibiotic 66-40B

BIOLOGICAL PROPERTIES OF ANTIBIOTIC 66–40B AND ANTIBIOTIC 66–40D

Although the antibiotics of this invention are epimers and, therefore, are closely related structurally, they differ substantially from each other and from sisomicin in their biological properties. For example, when bioassayed against *Bacillus subtilis* relative to sisomicin, Antibiotic 66–40B gives an assay value of 60 mcg/mg. and Antibiotic 66–40D gives an assay value of 324 mcg/mg. By the same assay procedure sisomicin gives an assay value of 1000 mcg/mg.

IN VITRO ANTIBACTERIAL ACTIVITY

The in vitro antibacterial activity of Antibiotics 66–40B and 66–40D in terms of minimal inhibitory concentration of the free base against a variety of gram positive and gram negative microorganisms many of which are clinical isolates is set forth in Table 1. Corresponding values for sisomicin are given for comparison. The tests were carried out using standard procedures in Mueller-Hinton broth buffered at pH 7.4.

Table 1

Minimal Inhibitory Concentration (MIC)

| Organism | MIC (mcg/ml) Antibiotic 66–40B | Antibiotic 66–40D | Sisomicin |
|---|---|---|---|
| Staphylococcus aureus | 3.0 | 0.08–0.3 | 0.03 |
| Streptococcus pyogenes C | >25 | 7.5 | 3.0 |
| Bacillus subtilis | 3.0 | <0.01 | <0.01 |
| Escherichia coli | 3.0 | 0.75 | 0.5 |
| Escherichia coli, 589 and Baker 2 | >25 | 3.0 | 0.75 |
| Escherichia coli, Swindinsky | >25 | 7.5 | 3.0 |
| Escherichia coli, JR90 and JR88 | >25 | 3.0 | >25 |
| Escherichia coli, W677/R55 | >25 | >25 | >25 |
| Pseudomonas aeruginosa | 3.0–>25 | 0.3–0.75 | 0.03–0.3 |
| Pseudomonas aeruginosa, Travers | >25 | >25 | >25 |
| Pseudomonas aeruginosa, Stones | >25 | 3.0 | >25 |
| Klebsiella pneumoniae, Adler | 7.5 | 0.08–0.3 | 0.03–0.08 |
| Klebsiella pneumoniae, Providence | >25 | >25 | >25 |
| Klebsiella pneumoniae, Georgetown | >25 | 17.5 | 17.5 |
| Proteus mirabilis | 17.5 | 3.0 | 3.0 |
| Serratia marcescens | 17.5 | 0.8 | 0.3 |

IN VIVO ANTIBACTERIAL ACTIVITY

The protective activity of the antibiotics of this invention is determined by the subcutaneous administration of the respective antibiotics (1) hour after intraperitoneal infection with a lethal dose of *Staphylococcus aureus* (Gray). Untreated, infected animals (CF-1 mice, Carworth Farms) usually die 18–24 hours after infection. Survivors are determined 48 hours after infection and the $PD_{50}$ (mg/kg) calculated by standard probit procedures. Table 2 sets forth the protective activity of the antibiotics of the instant invention.

Table 2

| Antibiotic 66-40B | Antibiotic 66-40D |
|---|---|
| 27 mg./kg. | 2.2 mg./kg. |

ACUTE TOXICITY

The acute intravenous toxicity of Antibiotic 66–40B and Antibiotic 66–40D in terms of $LD_{50}$ as determined in CF-1 mice by standard test methods is set forth in Table 3.

Table 3

| Antibiotic 66-40B | Antibiotic 66-40D |
|---|---|
| $LD_{50}$ via I.V. 70 mg./kg. | $LD_{50}$ via I.V. 83 mg./kg. |

IN VITRO ANTIVIRAL ACTIVITY

Antibiotic 66–40D is active in tissue culture as an antiviral agent against influenza virus. Antibiotic 66–40B exhibits no significant activity under substantially the same experimental conditions.

As established above, the antibiotic compounds of this invention exhibit significant antibacterial activity against a variety of gram-positive and gram-negative microorganisms. Thus, they may be used to inhibit or to eradicate susceptible microorganisms in such places as hospitals, especially in bathrooms and on objects that are particularly susceptible to contamination e.g. examining tables, bathtubs, showers, sinks, examining instruments or the like. These antibacterial agents are of exhanced value when used in conjunction with solutions of soaps and detergents for cleaning contaminated surfaces.

The antibiotics of this invention may be compounded into formulations for topical and/or parenteral administration. These formulations may additionally contain the usual excipients found in such dosage forms. Further, these formulations may also contain other compatible therapeutic agents such as anti-anxiety, antipyretic, antiphlogistic agents or the like. In general, the topical preparations will contain from about 0.1 percent to about 1 percent of antibiotic per 100 gms. of ointment, cream or lotion. These preparations are usually applied to the site of the infection and areas contiguous thereto from about 2 to about 5 times a day.

For parenteral administration, the antibiotics of this invention may generally be given in 2 to 4 equal doses totaling from about 10 to about 20 mg/kg/day. The precise dose to be administered will vary with the stage and severity of the infection, the susceptibility of the infecting organism to the antibiotic and the individual characteristics of the animal species under treatment. The precise regimen to be followed in treating the infection is best left to the discretion of the practitioner.

The compounds of this invention may be obtained by subjecting the product from Example 2 of the aforementioned British Pat. (i.e., 1,274,518) to the processes of the following specific examples.

EXAMPLE 1

Isolation of Garamine, Antibiotic 66–40B and Antibiotic 66–40D

A. To a chromatographic column of about 305 cm. in length by about 10 cm. in diameter containing silica gel, add 225 g. of crude antibiotic complex dissolved in the lower phase of a solvent mixture consisting of chloroform, methanol, concentrated ammonium hydroxide in the volume ratio of 1:1:1. Elute the column with the same solvent mixture at the rate of about 30 to about 35 ml/minute. Collect fractions of about 1600 ml. and monitor each fraction by thin-layer chromatography on silica gel plates using the same solvent system as that used on the column. Combine the fractions containing material having the same mobility on thin-layer and evaporate the fractions to dryness to obtain two fractions of active material. The first (least polar) fraction eluted contains substantially pure sisomicin and the last (most polar) fraction contains residual sisomicin, garamine, antibiotic 66–40B and Antibiotic 66–40D.

B To a chromatographic column of about 170 cm. in length by about 7.5 cm. in diameter containing silica gel, add 8.3 g. of antibiotic complex consisting of residual sisomicin, garamine, Antibiotic 66–40B and Antibiotic 66–40D dissolved in a solvent mixture consisting of chloroform-methanol-15 percent ammonium hydroxide in the ratio of 3:5:3 (v/v). Elute the column with the same solvent mixture at the rate of about 2 to about 3 ml/minute. Collect fractions of about 20 ml. and monitor each fraction by thin layer chromatography on silica gel plates using the same solvent system as that used for the column. Combine the fractions containing material having the same mobility and evaporate the fractions to dryness to obtain solid fractions enriched with a single product but containing traces of coproduced materials. The first (least polar) fraction eluted is the residual sisomicin followed by garamine which is in turn followed by Antibiotic 66–40B with Antibiotic 66–40D being last to emerge. These enriched fractions are rechromatographed each on a separate silica gel column with the same solvent mixture and the fractions are evaporated to yield the compounds of this invention free from substances coproduced in the fermentation.

C. Dissolve each of the compounds in deionized water and pass the solutions through individual columns containing Amberlite IRA-401S ion exchange resin (Rohm and Haas, Philadelphia, Pennsylvania) and elute the columns with deionized water. Concentrate the resin effluent from each column in vacuo to about 100 ml. and lyophilize to obtain:

i. 1.0 g., garamine;
ii. 1.6 g., Antibiotic 66–40B monohydrate, m.p. 91°-102°C, $[\alpha]_D^{26}$ = +152.8° (C=0.3 percent $H_2O$);
iii. 0.8 g., Antibiotic 66–40D monohydrate, m.p. 92°-103°C, $[\alpha]_D^{26}$ = +147.3° (C=0.3 percent $H_2O$).

EXAMPLE 2

Antibiotic 66–40D Sulfate

Antibiotic 66–40D (100 mg.) was dissolved in water (10 ml.) and dilute sulfuric acid was added until the solution was neutral (pH 7). The solution was lyophilized to give the sulfate as a colorless amorphous solid having the empirical formula $C_{18}H_{35}N_5O_7 \cdot 2\frac{1}{2}H_2SO_4$.

To prepare Antibiotic 66–40D sulfate, subject Antibiotic 66–40D (base) to the procedure described in Example 2.

We claim:

1. Antibiotic 66–40B and Antibiotic 66–40D having the following structural formulae respectively:

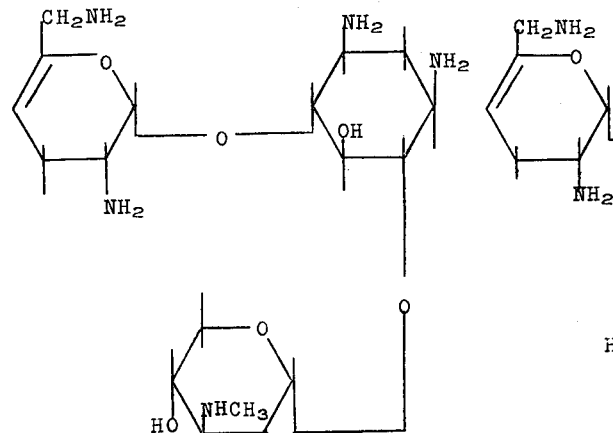

including mineral acid addition salts, Schiff base-oxazolidine derivatives and solvates of such compounds, each of said antibiotics being free of substances coproduced therewith.

2. A compound of claim 1, said compound being Antibiotic 66–40B a solid composition of matter having:
   a. a molecular weight of 433.2540 as determined by mass spectrometry;
   b. the empirical formula $C_{18}H_{35}N_5O_7$;
   c. a specific rotation as measured at the D line of sodium at 26° of +152.8° in water at 0.3 percent concentration;
   d. an antibacterial spectrum substantially as shown in Table I;
   e. a nuclear magnetic resonance spectrum in deuterium oxide exhibiting peaks at 2.49, 4.80, 4.96, and 5.27 parts per million;
   f. melting point (monohydrate) 91° – 102°C;
   g. a circular dichroism value $[\theta]_{290}$ of + 2,530 in tetraaminocopper sulfate solution;
   h. a circular dichroism value $[\theta]_{290}$ of + 1,935 in cupraammonium A;
   i. the following structural formula:

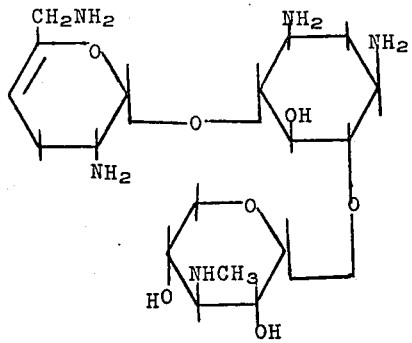

and being free of substances coproduced therewith.

3. A compound of claim 1, said compound being Antibiotic 66–40D a solid composition of matter having:
   a. a molecular weight of 433.2565 as determined by mass spectrometry;
   b. the empirical formula $C_{18}H_{35}N_5O_7$;
   c. a specific optical rotation as measured at the D line of sodium at 26°C of +147.3° in water at 0.3 percent concentration;

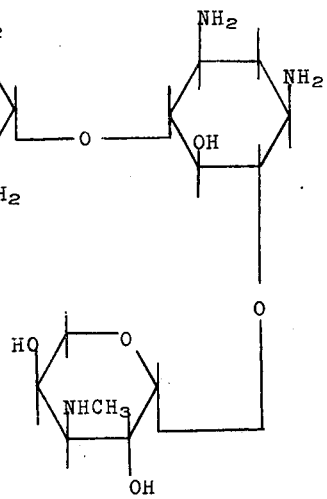

d. an antibacterial spectrum substantially as shown in Table I;
e. a nuclear magnetic resonance spectrum in deuterium oxide having peaks at 2.19, 4.66, 5.00 and 5.26 parts per million;
f. melting point (monohydrate) 92°–103°C;
g. a circular dichroism value $[\theta]_{290}$ of $-8,590$ in tetraaminocopper sulfate solution;
h. a circular dichronism value $[\theta]_{290}$ of $-6,270$ in cupraammonium A;
i. the following structural formula:

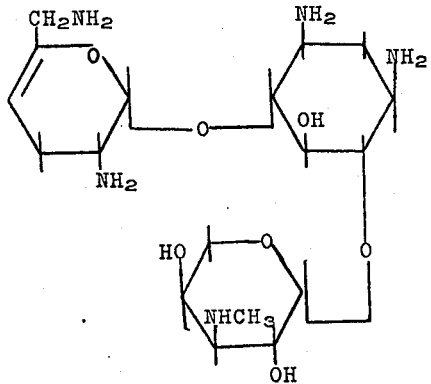

and being free of substances coproduced therewith.

4. A process which comprises separating Antibiotic 66–40B, Antibiotic 66–40D and garamine from a mixture containing same by (a) dissolving the mixture in a solvent system consisting of chloroform, methanol and 15 percent ammonium hydroxide in the volume ratio of 3:5:3, (b) adsorbing the resulting solution on silica gel (c) selectively desorbing the compounds from the silica gel using the same solvent (d) isolating said compounds from solution, and (e) rechromatographing the products from step (d) to obtain thereby the respective compounds free from coproduced substances.

* * * * *